United States Patent [19]
Gruenwald et al.

[11] Patent Number: 6,132,693
[45] Date of Patent: Oct. 17, 2000

[54] PROCESS AND DEVICE FOR REDUCING POLLUTANTS, ESPECIALLY NITROGEN OXIDES IN COMBUSTION EXHAUST GASES

[75] Inventors: Werner Gruenwald, Gerlingen; Klaus Dieterich, Stuttgart; Steffen Franke, Schwieberdingen, all of Germany

[73] Assignee: Robert Bosch GmbH, Stuttgart, Germany

[21] Appl. No.: 08/930,868

[22] PCT Filed: Apr. 6, 1996

[86] PCT No.: PCT/DE96/00643

§ 371 Date: Oct. 6, 1997

§ 102(e) Date: Oct. 6, 1997

[87] PCT Pub. No.: WO96/32181

PCT Pub. Date: Oct. 17, 1996

[30] Foreign Application Priority Data

Apr. 11, 1995 [DE] Germany ............... 195 13 654
Mar. 26, 1996 [DE] Germany ............... 196 11 898

[51] Int. Cl.⁷ .......... C01B 21/00; B01D 59/12; B01D 59/26; B01D 47/00; B01D 50/00; B01D 9/00; B01D 53/22; B01D 53/02

[52] U.S. Cl. ................ 423/235; 55/318; 55/321; 55/342; 95/47; 95/54; 95/130; 96/7; 96/8; 96/9; 96/134; 96/136; 96/141; 96/143; 96/144; 423/212

[58] Field of Search ............ 55/318, 321, 323, 55/342, 486; 95/47, 54, 130; 96/7, 8, 9, 134, 136, 141, 143, 144; 423/212, 235

[56] References Cited

U.S. PATENT DOCUMENTS

| | | | |
|---|---|---|---|
| 4,119,417 | 10/1978 | Heki et al. | 55/158 |
| 4,140,499 | 2/1979 | Ozaki et al. | 55/158 |
| 4,174,955 | 11/1979 | Blackmer et al. | 55/158 |
| 4,264,338 | 4/1981 | Null | 55/16 |

(List continued on next page.)

FOREIGN PATENT DOCUMENTS

| | | | |
|---|---|---|---|
| 290 970 | 5/1988 | European Pat. Off. | B01D 53/22 |
| 27 34 677 | 2/1979 | Germany | F02M 25/10 |
| 42 01 423 | 7/1993 | Germany | F02M 25/12 |
| 4404681 | 5/1995 | Germany | F02M 25/00 |

OTHER PUBLICATIONS

Linde AG, Product Brochure for Technical Gases, "Optimizing Combustion Processes With Oxygen Burners", May, 1998, pp. 1–6.

(List continued on next page.)

*Primary Examiner*—Steven P. Griffin
*Assistant Examiner*—Maribel Medina
*Attorney, Agent, or Firm*—Venable; George H. Spencer; Ashley J. Wells

[57] ABSTRACT

A process for reducing pollutants, particularly nitrogen oxides from combustion gases during a combustion process that takes place while oxygen is supplied, includes providing oxygen needed for the combustion process by separating oxygen from a gas mixture containing oxygen and nitrogen in a two-step process including (a) enriching the gas mixture with oxygen in a first step to provide an enriched gas mixture; and (b) separating oxygen out of the enriched gas mixture in a second step, wherein, during at least one step oxygen depleted gas mixture is removed via an outlet provided with permeability means that cause the outlet to have a higher permeability for nitrogen than oxygen. A device for carrying out this process includes a device for separating oxygen out of a gas mixture containing oxygen and nitrogen including a housing having an inlet for the gas mixture; an outlet for the oxygen separated out of the gas mixture; and first and second apparatuses which have a respectively different permeability for oxygen and nitrogen, and which divide the device into first, second, and third chambers, wherein at least the second chamber is connected to an outlet provided with a permeability device that cause the outlet to have a higher permeability for nitrogen than for oxygen.

19 Claims, 4 Drawing Sheets

U.S. PATENT DOCUMENTS

| | | | |
|---|---|---|---|
| 4,508,548 | 4/1985 | Manatt | 55/158 |
| 4,701,187 | 10/1987 | Choe et al. | 55/16 |
| 4,832,714 | 5/1989 | Gerdts | 55/158 |
| 4,869,733 | 9/1989 | Stanford | 55/21 |
| 4,880,440 | 11/1989 | Perrin | 55/16 |
| 5,160,713 | 11/1992 | Mazanec et al. | 423/210 |
| 5,185,014 | 2/1993 | Prasad | 55/16 |
| 5,447,555 | 9/1995 | Yee et al. | 95/54 |
| 5,516,359 | 5/1996 | Kang et al. | 95/14 |
| 5,526,641 | 6/1996 | Sekar et al. | 60/274 |
| 5,672,195 | 9/1997 | Moreau et al. | 95/96 |

OTHER PUBLICATIONS

Springmann, H., "Planning of Large Oxygen Facilities For Steel Mills", *Linde Reports On Technology And Science*, Issue 40, 1976, pp. 24–92.

Hausen, H., and Linde, H., *Cryogenics Generating Very Low Temperatures, Liquifying Gas And Separating Gas Mixtures*, Springer Publishing House, $2^{nd}$ Ed., 1985, pp. 281–287.

Overmann, L., and Staude, E., "Gas Separation With Membranes", *Crude Oil and Coal–Gas–Petrochemistry Combined with Fuel Chemistry*, vol. 40, Issue 10, 1987, pp. 427–431.

PROCESS AND DEVICE FOR REDUCING POLLUTANTS, ESPECIALLY NITROGEN OXIDES IN COMBUSTION EXHAUST GASES

This Application is the National Stage of PCT/DE 96/00643, filed Apr. 6, 1996.

BACKGROUND OF THE INVENTION

1. Field of the Invention

The invention relates to a process for reducing pollutants, particularly nitrogen oxides, in combustion exhaust gases and a device for reducing pollutants.

2. Description of the Related Art

State of the Technology

Processes and devices for reducing pollutants in combustion exhaust gases in a combustion process that takes place with the supply of oxygen are known. For example, in internal combustion engines in motor vehicles, which use a fuel-air mixture that is ignited with the aid of an ignition means, the nitrogen is removed from the oxygen-nitrogen-air mixture (atmosphere) prior to supply into the internal combustion engine, as disclosed in DE-PS 44 04 681. For this purpose, the oxygen-nitrogen-air mixture is guided across a barrier that is impermeable to nitrogen. Consequently, combustion can continue with the supply of atmospheric oxygen removed from the atmospheric air, while the atmospheric nitrogen present in the atmospheric air is not supplied to the combustion process. The formation of nitrogen oxides during the combustion process is prevented, or at least drastically reduced.

Moreover, ceramic components are known that have a membrane comprising an oxygen ion-conducting material. Components of this type are used, for example, as so-called lambda sensors to determine the oxygen content in exhaust gases of combustion processes. It is known that these oxygen ion-conducting membranes have differing oxygen-conducting capabilities at different temperatures and under different pressure conditions.

So-called zeolites are further known from physical chemistry. They are distinguished by a structure having large, internal hollow spaces that are connected to one another by pores of defined size. These pores of defined size can be set in a range of a few tenths of an Angstrom by, for example, interspersed cations that move freely within the crystal grid and can be exchanged in solution. If such zeolites are acted upon by an oxygen-nitrogen-air mixture, due to the steric effect only the molecules whose diameters are smaller than the width of the pore opening reach the interior of the crystal structure. Thus, a sieving effect occurs. In the kinetic effect, certain molecules diffuse in and through the crystal structure faster than others, likewise causing a separating effect. If the oxygen-nitrogen-air mixture is fragmented, the separation of nitrogen and oxygen is based on the equilibrium effect. In this instance, different absorption forces are responsible for the stronger bonding of one component, for example nitrogen, than another component, such as oxygen.

SUMMARY OF THE INVENTION

The present invention provides a process of reducing pollutants, particularly nitrogen oxides, in combustion exhaust gases in a combustion process that takes place with the supply of oxygen, with the oxygen being removed from an oxygen-nitrogen-air mixture in a two-step process, characterized in that, in at least one step, the oxygen-depleted oxygen-nitrogen-air mixture is carried off via an outlet device provided with means that cause the outlet device to be more permeable to nitrogen than oxygen.

The process of the invention, offers the advantage that relatively little energy can be used to remove the oxygen from the oxygen-nitrogen-air mixture. In accordance with the invention, a fortification of oxygen is effected in the oxygen-nitrogen-air mixture in a first step (fortification step). In a subsequent, second step, the oxygen is removed, in pure or virtually pure form, from the oxygen-fortified oxygen-nitrogen-air mixture (removal or separation step). A result of the oxygen fortification in the first step is a lower energy consumption for heating the oxygen-nitrogen-air mixture during the second step, because no unnecessarily large quantity of nitrogen need be heated with the mixture. In addition, because of the oxygen fortification in the first step, the oxygen partial pressure of the oxygen-nitrogen-air mixture present in the second step can be approximately doubled in comparison to the oxygen partial pressure in pure air. Therefore, the compression and/or heating energy to be used in the second step can be reduced significantly. If the same quantity of oxygen is to be removed, only a smaller quantity of the oxygen-nitrogen-air mixture must be compressed.

The fortification of the oxygen in the oxygen-nitrogen-air mixture that is performed in the first process step can be achieved, for example, with the aid of an apparatus or barrier that is more permeable to oxygen than nitrogen, such as a plastic membrane or a zeolite.

In the use of plastic membranes, in accordance with the invention an oxygen fortification of the oxygen-nitrogen-air mixture is performed in a first process step by means of a plastic membrane that is permeable to different degrees to oxygen and nitrogen. Oxygen can pass more quickly through the membrane, and is therefore fortified on the low-pressure side of the membrane.

If zeolites are used, they are exposed to the oxygen-nitrogen-air mixture at higher pressure, with the nitrogen preferably being absorbed and stored. This means that the air current passing through is fortified with oxygen. The zeolite is purified of nitrogen by being exposed to a low gas pressure (regeneration step). In accordance with the invention, alternating operation between at least two zeolite stations is necessary for continuous operation. The gas currents are routed via flap valves such that one zeolite vessel is respectively undergoing the oxygen-fortification step, while the other is undergoing the regeneration step.

The air mixture passing through the barrier is therefore oxygen-fortified, while an oxygen-depleted air mixture is carried off via an outlet in the space in front of the barrier.

In a second process step, the oxygen-fortified oxygen-nitrogen-air mixture is supplied, for example, to a ceramic membrane for removal of pure or virtually pure oxygen. The ceramic membrane preferably comprises a mixed-conductive material, that is, a material that conducts both oxygen ions and electrons. The ceramic membrane is preferably heated in accordance with the invention. The invention may provide that only the ceramic, not the oxygen-enriched oxygen-nitrogen-air mixture supplied to it, is heated. The supplied oxygen-fortified oxygen-nitrogen-air mixture is, however, also advantageously heated, so it does not lead to cooling of the heated ceramic upon impact. In a particularly advantageous manner, the supplied oxygen-fortified oxygen-nitrogen-air mixture can be acted upon by pressure. Pure or virtually pure oxygen is removed via the mixed-conductive ceramic membrane, while an oxygen-depleted air mixture is carried off via a second outlet in the space in front of the ceramic membrane.

In a particularly advantageous manner, a further oxygen fortification and thus an increase in the oxygen partial pressure can be achieved in the first and/or second process step in that the respective oxygen-depleted air mixtures to be carried off are conducted across further apparatuses, for example plastic membranes, that have an increased permeability for nitrogen and a reduced permeability for oxygen. The oxygen-nitrogen-air mixture that was carried off in the first process step has a smaller oxygen component than the oxygen-nitrogen-air mixture supplied to the first process step via the inlet, and that of the oxygen-nitrogen-air mixture supplied to the second process step; nevertheless, it contains oxygen, so the oxygen migrates out undesirably. Likewise, in the second process step, an oxygen-depleted oxygen-nitrogen-air mixture is carried off, so an undesired out-migration of oxygen also occurs here. In accordance with the invention, this out-migration of oxygen is prevented or reduced in that the respective outlet means for the oxygen-depleted oxygen-nitrogen-air mixture contain further apparatuses that selectively hold back the oxygen; in other words, the means are more permeable to nitrogen than oxygen. This inhibits the undesired migration of oxygen out of the process, and the oxygen partial pressure acting as a driving force of fortification and/or separation at the membranes that are more permeable to oxygen is maintained at a higher level than if these further apparatuses were not provided. This significantly improves the energy balance of the process of the invention.

The present invention additionally provides a device for reducing pollutants, particularly nitrogen oxides, in combustion exhaust gases in a combustion process that takes place with the supply of oxygen, the device having an arrangement for removing the oxygen from an oxygen-nitrogen-air mixture (atmosphere), with the device (10) having two apparatuses (18, 18', 22) that are permeable to different degrees to oxygen $O_2$ and nitrogen $N_2$, the apparatuses being disposed between an inlet (14) for the oxygen-nitrogen-air mixture (16) and an outlet (26) for the removed oxygen $O_2$, characterized in that the device (10) is subdivided into three chambers (12, 20, 24) by the apparatuses (18, 18', 22), and at least one chamber is connected to an outlet device (12, 20, 44) that has a means (19, 21) that is more permeable to nitrogen than oxygen.

The device of the invention for reducing pollutants, has the advantage that a low-energy removal of oxygen from an oxygen-nitrogen-air mixture is possible with simple means within a very small space. Because the arrangement has two apparatuses that are respectively permeable to different degrees to oxygen and nitrogen, the apparatuses being disposed between an inlet for the oxygen-nitrogen-air mixture and an outlet for the removed oxygen, it is advantageously possible to use this device to generate an oxygen-fortified oxygen-nitrogen-air mixture in a first process step, from which mixture the oxygen is then removed in a second process step. With the two apparatuses, the device can preferably be subdivided into three chambers, with the apparatuses being disposed between the individual chambers and permitting an independent treatment of the oxygen-nitrogen-air mixture. Consequently, it is possible in a simple manner to achieve different oxygen concentrations in the individual chambers, so the oxygen can be removed simply from a chamber having an increased oxygen concentration.

The invention particularly provides that the first and second chambers respectively have an outlet for an oxygen-depleted oxygen-nitrogen-air mixture. In an especially advantageous manner, at least one, and preferably both, of the outlets is or are provided with a further apparatus having a different permeability for oxygen and nitrogen, particularly being more permeable to nitrogen than oxygen. An apparatus of this type can be a membrane having increased permeability for nitrogen and a reduced permeability for oxygen, so the oxygen is selectively held back in the first and second chambers, and is additionally fortified.

In a preferred embodiment of the invention, it is provided that the first apparatus operates pressure-dependently, and the second apparatus operates pressure- and/or temperature-dependently. In a particularly preferable embodiment of the invention, it can be provided that the first and second apparatuses can be acted upon by different pressures independently of one another, so the generation of additional pressure drops can help to attain a further improvement in the energy balance of the oxygen fortification and removal. The further apparatuses preferably provided in the outlets likewise preferably operate pressure- and/or temperature-dependently. Consequently, relatively simple, available media, namely a pressure and a temperature, can be used to set the device at a different degree of oxygen removal.

Advantageous embodiments of the invention ensue from the other features disclosed in the dependent claims.

BRIEF DESCRIPTION OF THE DRAWINGS

The invention is described in detail below by way of embodiments illustrated in the attached drawings. Shown are in.

DESCRIPTION OF THE PREFERRED EMBODIMENTS

Figure 1:
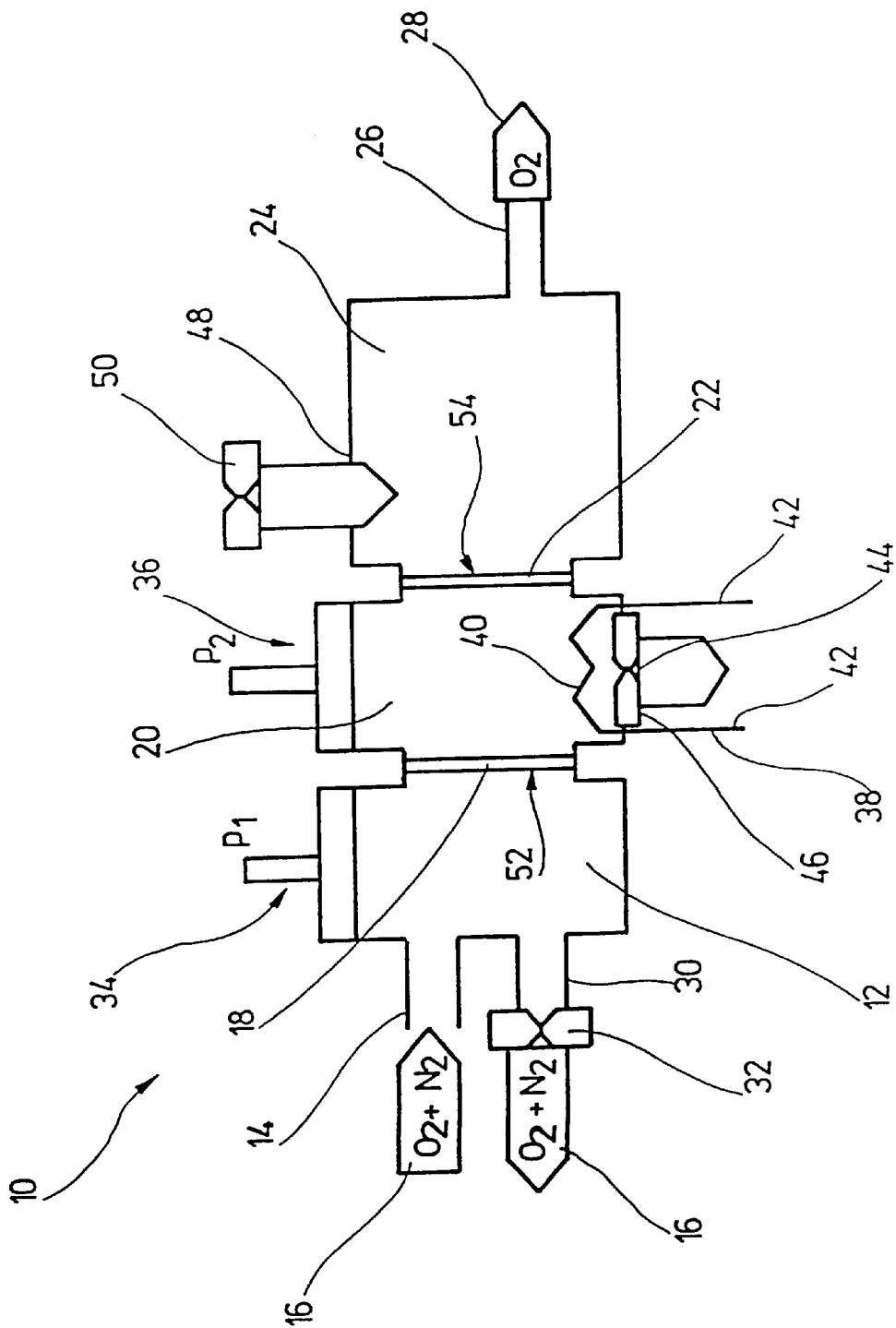
FIG. 1 schematically, an arrangement for removing oxygen from an oxygen-nitrogen-air mixture, FIG. 2 schematically, a further arrangement for removing oxygen from an oxygen-nitrogen-air mixture, in which the outlets are provided with further apparatuses, FIG. 3 schematically, a further arrangement for removing oxygen from an oxygen-nitrogen-air mixture, in which a chamber is subdivided into a low-pressure region and a high-pressure region, and FIG. 4 a schematic arrangement of an apparatus for fortifying the oxygen in an oxygen-nitrogen-air mixture.

FIG. 1 schematically shows a device for removing oxygen from an oxygen-nitrogen-air mixture 16, the device being generally indicated by 10. The device 10 has a first chamber 12, which is provided with an inlet 14 for the oxygen-nitrogen-air mixture 16. The first chamber 12 is separated from a second chamber 20 by a first apparatus 18, which will be explained below. The second chamber 20 is separated from a third chamber 24 by a second apparatus 22—also to be explained below. The third chamber 24 has an outlet 26 for oxygen 28 that has been removed by the device 10. The first chamber 12 is further provided with an outlet 30 for the oxygen-nitrogen-air mixture 16; a throttle valve 32 is disposed in the outlet 30. Means 34 for exerting a first pressure p1 on the first chamber 12 are further provided at the first chamber 12. The second chamber 20 includes means 36 for exerting a pressure p2 on the second chamber 20. Furthermore, a heating device 38 is provided in the second chamber 20; this device has, for example, a heating spiral 40 that is disposed inside the chamber 20 and can be connected to a heating voltage by way of connections 42. Moreover, the second chamber 20 has an outlet 44, in which a throttle valve 46 is disposed. The third chamber 24 has an inlet 48, in which a further throttle valve 50 is disposed.

The first apparatus 18 comprises a membrane 52, which has a different degree of permeability (permeation rate) for oxygen $O_2$ and nitrogen $N_2$ when a pressure difference exists between the first chamber 12 and the second chamber 20. The second apparatus 22 comprises a mixed-conductive ceramic membrane 54, a so-called perovskite.

With the device of the invention, which is illustrated in FIG. 1, the process of the invention progresses as follows:

The first chamber 12 is acted upon by an oxygen-nitrogen-air mixture 16 by way of the inlet 14. This oxygen-nitrogen-air mixture typically comprises the atmospheric air of the device 10. The throttle valve 32 of the outlet 30 of the first chamber 12 effects a smaller cross section of the outlet 30 with respect to the cross section of the inlet 14. The first chamber 12 is acted upon by the pressure p1 by way of the means 34. This establishes a pressure difference between the chamber 12 and the second chamber 20 that is present on both sides of the membrane 52. Because the membrane 52 is permeable to different degrees to oxygen $O_2$ and nitrogen $N_2$ when a pressure difference exists, the oxygen $O_2$ can diffuse more quickly through the membrane 52 than the nitrogen $N_2$. As a result, a larger proportion of oxygen $O_2$ than nitrogen $N_2$ diffuses into the second chamber 20. The first chamber 12 is preferably permanently acted upon by the pressure p1, so oxygen $O_2$ can continuously diffuse through the membrane 52 in larger quantities, and nitrogen $N_2$ can continuously diffuse through in smaller quantities. The surplus oxygen-nitrogen-air mixture 16 is continuously discharged via the throttle valve 32 of the outlet 30 in a controlled manner; the exiting oxygen-nitrogen-air mixture 16 has a smaller oxygen $O_2$ component than the oxygen-nitrogen-air mixture supplied via the inlet 14.

Thus, with the first apparatus 18, an oxygen-nitrogen-air mixture is present in the second chamber 20 that has a larger oxygen $O_2$ component than the oxygen-nitrogen-air mixture 16 present at the inlet 14. This mixture fortified with oxygen $O_2$ is now heated by the heating device 38 and acted upon by a pressure p2 exerted by the means 36. This compresses the oxygen-nitrogen-air mixture in the second chamber 20, and presses it against the ceramic membrane 54. A controlled pressure buildup in the second chamber 20 can be established by a setting of the throttle valve 46. The ceramic membrane 54 is mixed-conductive, effecting an acceleration of the oxygen ions in the direction of the third chamber 24. Because the oxygen ions have a negative potential, an opposing electron conduction takes place through the ceramic membrane 54. This membrane is thus configured as a mixed-conductive ceramic membrane 54. The gradient of the oxygen partial pressure across the ceramic membrane 54 functions as the driving force of the oxygen-ion transport. Hence, the proportion of oxygen ions $20^{-2}$ can be established through the setting of a pressure p2 in the second chamber 20; the proportion diffuses from the second chamber 20 into the third chamber 24 during a specific period of time.

The heating device 38 is provided because the oxygen-nitrogen-air mixture in the chamber 20 must have a certain thermal potential for the diffusion process of the oxygen ions that is to take place through the ceramic membrane 54. Here, however, a considerably smaller quantity of energy is necessary than in conventional heating of the oxygen-nitrogen-air mixture, because an oxygen-nitrogen-air mixture that is fortified with oxygen $O_2$ must be heated. The relative proportion of nitrogen $N_2$ is therefore smaller with respect to the total composition, so relatively little nitrogen must be heated with the mixture. Furthermore, a higher oxygen partial pressure results inside the second chamber 20 due to the oxygen-fortified oxygen-nitrogen-air mixture, so the pressure p2 to be exerted for the diffusion of oxygen ions through the ceramic membrane 54 can be relatively low. As a result, heating and compression energy are saved.

Overall, the coupling, that is, the arrangement of the membrane 52 (oxygen fortification) before the ceramic membrane 54 (oxygen separation), results in a lower specific separation output (total output/separated quantity of oxygen) because of the smaller quantity of nitrogen $N_2$ to be heated and compressed, and because of the increased oxygen partial pressure as the driving separation force, due to the aforementioned oxygen concentration.

The oxygen ions that have diffused into the third chamber 24 can be mixed with an inert gas via the inlet 48, which gas takes over the transport of the oxygen $O_2$ via the outlet 26 to a combustion chamber in that a combustion process takes place with the supply of oxygen. A combustion exhaust gas from the combustion process, for example, can be used as an inert gas for transporting the oxygen $O_2$; such a gas is re-supplied to the combustion process via a short-circuit line. In this instance sufficient oxygen from the diffused-in oxygen ions is available for the combustion process. The nitrogen $N_2$ originally present in the oxygen-nitrogen-air mixture 16 is therefore excluded from involvement in the combustion process, so the formation of nitrogen oxides $NO_x$ during the combustion process is drastically reduced, and only a residual component remains due to the nitrogen component of the fuel.

Figure 2:
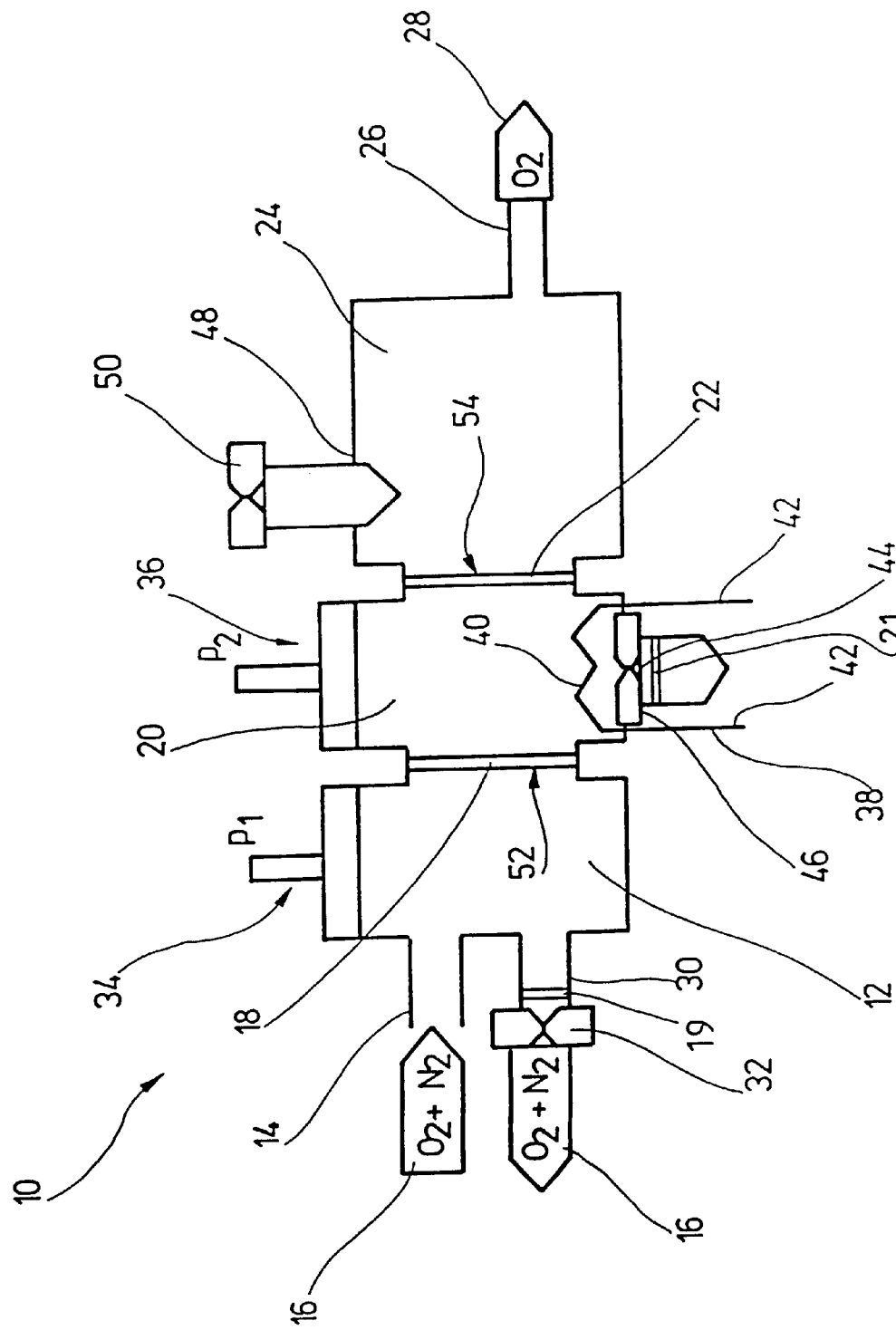

The arrangement of FIG. 2 corresponds to that of FIG. 1, except that the outlets 30 and 44 are provided with further apparatuses 19 and 21. These apparatuses respectively comprise a membrane that has an increased permeability for nitrogen and a reduced permeability for oxygen. In FIG. 2, the apparatus 19 is on the pressure side of the throttle valve 32, and the apparatus 21 faces away from the pressure of the throttle valve 46. Other arrangements of the throttle valve 32 or 46 relative to the apparatus 19 or 21 are also possible, however; for example, the apparatus 19 can be disposed on the side of the throttle valve 32 facing away from the pressure, and/or the apparatus 21 can be disposed on the side of the throttle valve 46 facing the pressure. In accordance with the invention, it can also be provided that the throttle valve 32 and/or 46 is or are replaced by the apparatus 19 and/or 21.

The process executed with this device corresponds to the one explained in conjunction with FIG. 1, except that the oxygen-depleted oxygen-nitrogen-air mixture exiting the outlets 30 and 44 is conducted through the further apparatuses 19 and 21 that are more permeable to nitrogen than oxygen, inhibiting the undesired migration of oxygen out of the chambers 12 and 20. A result of this is an oxygen partial pressure in these two chambers that is maintained at a higher level in comparison to a device that is not equipped with these further apparatuses 19 and/or 21, so the energy to be used for fortification and removal is further reduced.

Figure 3:
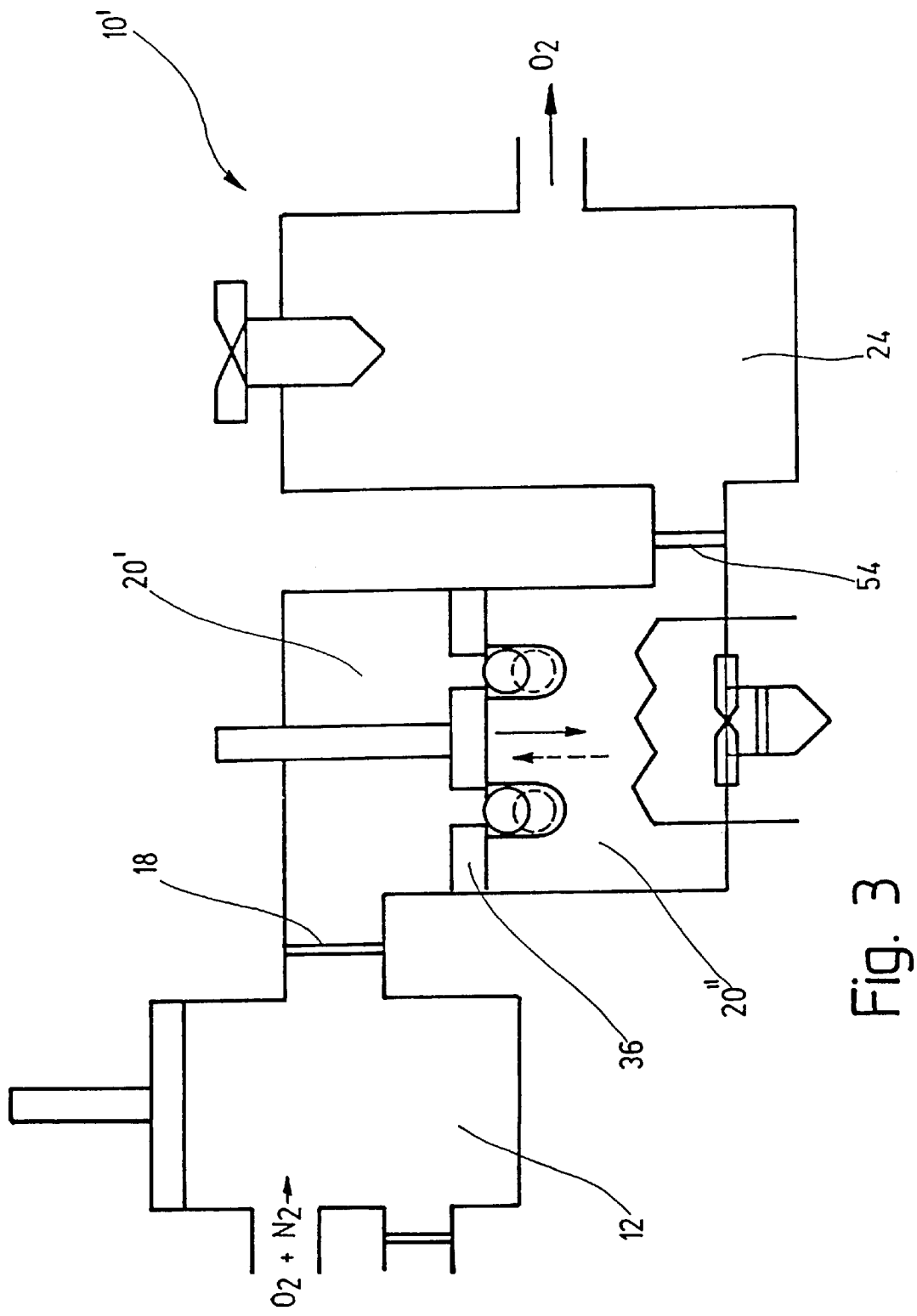

FIG. 3 schematically shows a device for fortification and removal of oxygen, the device being indicated by 10' and corresponding to the device shown in FIG. 2, except that the chamber 20 is subdivided into a low-pressure region 20' that is associated with the apparatus 18 and a high-pressure region 20" that is associated with the apparatus 54. The low-pressure region 20' and the high-pressure region 20" are coupled with respect to pressure by the apparatus 36, which can be configured as a vacuum pump, for example. The apparatus 18 can be acted upon by a pressure other than the one acting on the apparatus 54. The subdivision of the chamber 20 into regions 20' and 20" with different pressure conditions permits additional pressure drops that drive the oxygen fortification and separation to be effected. Of course, the invention also encompasses a multiple-stage embodiment of the apparatus 36, so the setting of essentially independent pressures is permitted, for example, in regions 20' and 20". The low-pressure region 20' advantageously has an underpressure relative to the chamber 12, so a pressure drop that additionally drives the oxygen fortification is established. Conversely, the high-pressure region 20" has an overpressure relative to the chamber 24, so an additional pressure drop that is favorable for the oxygen separation is present here.

Figure 4:
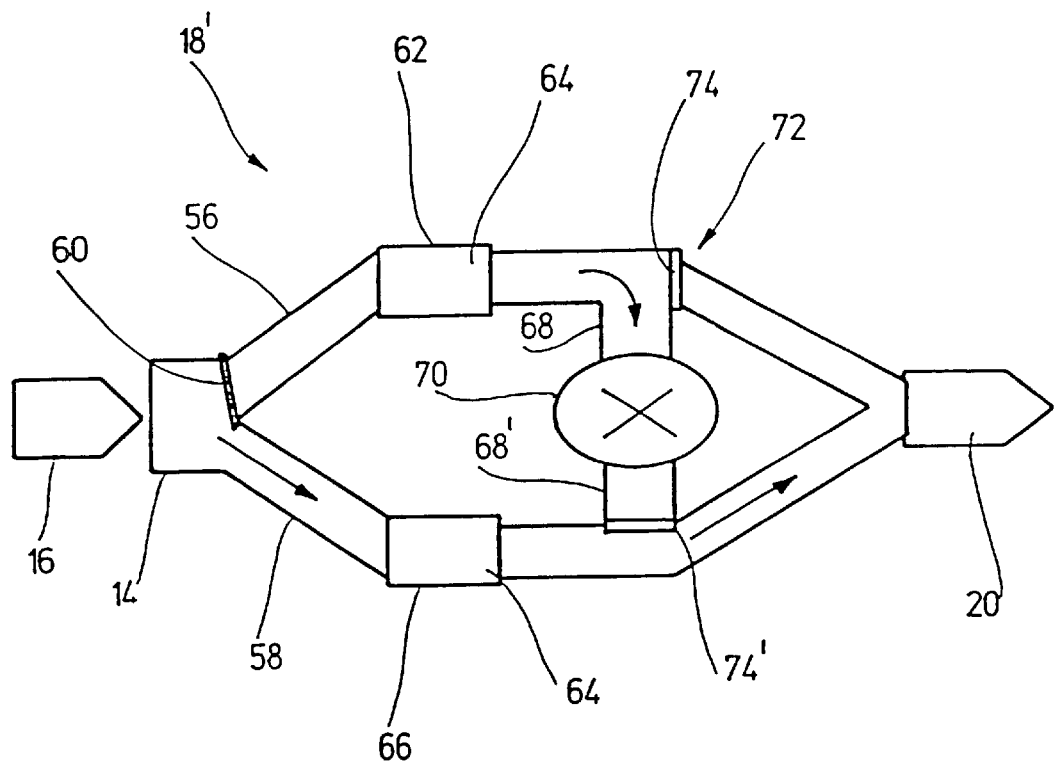

FIG. 4 shows a further embodiment of the first apparatus 18. The apparatus 18' of FIG. 4 can be used in place of the apparatus 18 explained in conjunction with FIG. 1, in which case, for better understanding, identical parts having identical functions are provided with the same reference numerals, although they have different designs.

The apparatus 18' includes the inlet 14 for the oxygen-nitrogen-air mixture 16. The inlet 14 is connected to a first channel 56 and a second channel 58. The channels 56 and 58 can be alternately connected to the inlet 14, or separated from it, by way of an apparatus 60, for example a flap. A region 62 that is equipped with a zeolite 64 is provided in the channel 56. Correspondingly, the channel 58 includes a region 66 that is also equipped with a zeolite 64. In the regions 62 and 66 of the channels 56 and 58 having the zeolite 64, the zeolite 64 advantageously extends over the entire cross section of the channels 56 and 58. The channels 56 and 58 terminate in the second chamber 20 of the device 10 (FIG. 1). Between the regions 62 and 66 having the zeolite 64 and the chamber 20, the channels 56 and 58 are connected via a branch 68 and 68', respectively, to a conveying device 70, for example a pump. Between the branches 68 and 68' and the second chamber 20, the channels 56 or 58 can respectively be connected to or separated from the chamber 20 by way of a blocking device 72 that can be alternately actuated. The blocking device 72 has two flap valves 74 and 74', which are coupled to one another and alternately connect the conveying device 70 or the chamber 20 to the channel 56 or 58.

The apparatus 18' shown in FIG. 4 functions as follows:

In the initial state, the apparatus 60 closes the channel 56, so the channel 58 is connected to the inlet 14. At the same time, the blocking device is switched such that the flap valve 74' seals the branch 68' and the channel 58 is connected to the second chamber 20. The first channel 56 is connected to the conveying device 70 by way of the branch 68, while the flap valve 74 separates the channel 56 from the second chamber 20. Via the inlet 14, the apparatus 18' is acted upon by the oxygen-nitrogen-air mixture 16 at a pressure of approximately 1 bar. The oxygen-nitrogen-air mixture 16 is thus conducted to the zeolite 64 disposed in the region 66 of the channel 58. The zeolite 64 possesses a structure that allows the nitrogen molecules of the oxygen-nitrogen-air mixture 16 to be absorbed, while the oxygen molecules can pass through the region 66. Thus, an oxygen-nitrogen-air mixture 16 is present in the second chamber 20 that has a higher oxygen proportion than at the inlet 14. As already explained in conjunction with FIG. 1, the oxygen is then separated out of this oxygen-nitrogen-air mixture fortified with oxygen.

Because the region 66 having the zeolite 64 is known to have only a certain storage capacity, and therefore the nitrogen absorption can lead to saturation, the apparatus 18' can be selectively reversed, for example with time control, as follows. The flap of the apparatus 60 is reversed such that the channel 56 is connected to the inlet 14, while the channel 58 is separated from the inlet 14. At the same time, the blocking device 72 is reversed, so the flap valve 74 blocks the branch 68 and connects the channel 56 to the second chamber 20. The flap valve 74' simultaneously releases the branch 68' and separates the channel 58 from the second chamber 20. Now the zeolite 64 in the region 66 is acted upon by an underpressure by way of the conveying device 70. This is known to effect a regeneration of the zeolite 64 in the region 66. This change in pressure at the zeolite 64 in the region 66 causes the nitrogen that has previously been absorbed from the oxygen-nitrogen-air mixture 16 to be sucked up by the conveying device 70, so the mixture is partially purified of nitrogen molecules.

While the zeolite 64 in the region 66 is regenerated, the oxygen-nitrogen-air mixture 16 is conducted via the zeolite 64 in the region 62 of the channel 56. Here the oxygen-nitrogen-air mixture 16 fortified with oxygen is supplied in the above-described manner to the second chamber 20 via the channel 56.

The selected design of the apparatus 18', particularly the arrangement of the apparatus 60 or the blocking device 72, assures a continuous operation, because the zeolite 64 in the regions 62 and 66 alternately absorbs and regenerates the nitrogen of the oxygen-nitrogen-air mixture.

It is possible to fortify the oxygen in the oxygen-nitrogen-air mixture by over 50% with the apparatus 18'. As already explained in conjunction with FIG. 1, this oxygen-fortified oxygen-nitrogen-air mixture is now supplied to the second apparatus 22; that is, it is guided to the mixed-conductive ceramic membrane 54 with the effect of temperature and/or pressure.

A very advantageous application of the device 10 ensues, for example, from the supply of a fuel-air mixture for an internal combustion engine in motor vehicles. The release of nitrogen oxides is prevented, or at least significantly reduced, in motor vehicles equipped with the device 10 of the invention.

What is claimed is:

1. A process for reducing pollutants, particularly nitrogen oxides from combustion gases during a combustion process that takes place while oxygen is supplied, the process comprising:
   providing oxygen needed for the combustion process by separating oxygen from a gas mixture containing oxygen and nitrogen in a two step process comprised of:
      a. enriching the gas mixture with oxygen in a first step to provide an enriched gas mixture; and
      b. separating oxygen out of the enriched gas mixture in a second step,
   wherein, during at least one step, oxygen depleted gas mixture is removed via an outlet provided with permeability means that cause the outlet to have a higher permeability for nitrogen than oxygen.

2. The process according to claim 1, wherein enriching the gas mixture with oxygen in the first step is accomplished by one of absorption of nitrogen or by means of a membrane which has a higher permeation rate for oxygen than for nitrogen.

3. The process according to claim 1, wherein separating oxygen out of the enriched gas mixture in the second step is accomplished with an oxygen-ion conducting membrane.

4. The process according to claim 3, wherein the gas mixture is supplied in at least one step of the two step process under pressure to at least one of (a) the oxygen-ion conducting membrane and (b) the outlet.

5. The process according to claim 3, wherein the oxygen separated out in the second step is diffused into the combustion gases by means of the oxygen-ion conducting membrane, and wherein diffusion of the oxygen into the combustion gases per unit of time is influenced by adjusting at least one of pressure of the enriched gas mixture and temperature of the enriched gas mixture.

6. The process according to claim 1, further comprising compressing the enriched gas mixture from the first step.

7. The process according to claim 1, further comprising heating the enriched gas mixture from the first step.

8. A device for carrying out the process according to claim 1, comprising:

a device for separating oxygen out of a gas mixture containing oxygen and nitrogen comprised of a housing having an inlet for the gas mixture; an outlet for the oxygen separated out of the gas mixture; and first and second apparatuses which have a respectively different permeability for oxygen and nitrogen, and which divide the device into first, second, and third chambers, wherein at least the second chamber is connected to an outlet provided with permeability means that cause the outlet to have a higher permeability for nitrogen than for oxygen.

9. The device according to claim 8, wherein the first and second apparatuses are arranged independent of each other.

10. The device according to claim 8, wherein the first apparatus is pressure dependent in operation.

11. The device according to claim 8, wherein the second apparatus is at least one of pressure dependent and temperature dependent in operation.

12. The device according to claim 8, wherein first chamber is connected to the inlet and the third chamber is connected to the outlet for the oxygen separated out of the gas mixture.

13. The device according to claim 8, wherein the first apparatus is arranged between the first chamber and the second chamber, and wherein the second apparatus is arranged between the second chamber and the third chamber.

14. The device according to claim 8, wherein first and second chamber may be pressurized separately with respective pressures p1 and p2.

15. The device according to claim 8, wherein the second chamber is provided with heating means.

16. The device according to claim 8, wherein the first apparatus contains at least in some regions a zeolite having a nitrogen-absorbing structure.

17. The device according to claim 16, wherein the apparatus contains channels having respective regions containing zeolite which may be alternately filled with the gas mixture and connected to the second chamber.

18. The device according to claim 16, further comprising a conveying device associated with the first apparatus for admitting the zeolite under a low pressure for regeneration thereof.

19. The device according to claim 8, wherein the second apparatus comprises a mixed-conductive ceramic membrane which is arranged between the second chamber and the third chamber.

* * * * *